(12) United States Patent
Izawa et al.

(10) Patent No.: US 7,653,100 B2
(45) Date of Patent: Jan. 26, 2010

(54) SOLID LASER MODULE, OPTICAL AMPLIFIER, AND LASER OSCILLATOR

(75) Inventors: Yasukazu Izawa, Ibaraki (JP);
Masayuki Fujita, Ikeda (JP); Shigeki Tokita, Uji (JP); Tadashi Ikegawa, Hamamatsu (JP); Toshiyuki Kawashima, Hamamatsu (JP); Hirofumi Kan, Hamamatsu (JP)

(73) Assignees: Osaka University, Suita-shi, Osaka (JP); Hamamatsu Photonics K.K., Hamamatsu-shi, Shizuoka (JP)

( * ) Notice: Subject to any disclaimer, the term of this patent is extended or adjusted under 35 U.S.C. 154(b) by 126 days.

(21) Appl. No.: 11/663,960

(22) PCT Filed: Nov. 24, 2005

(86) PCT No.: PCT/JP2005/021572
§ 371 (c)(1),
(2), (4) Date: Mar. 28, 2007

(87) PCT Pub. No.: WO2006/070548
PCT Pub. Date: Jul. 6, 2006

(65) Prior Publication Data
US 2008/0089372 A1    Apr. 17, 2008

(30) Foreign Application Priority Data
Dec. 28, 2004    (JP)    ............... 2004-380393

(51) Int. Cl.
*H01S 3/04*    (2006.01)
(52) U.S. Cl. .......................................... 372/36; 372/34
(58) Field of Classification Search .................. 372/34, 372/36
See application file for complete search history.

(56) References Cited

U.S. PATENT DOCUMENTS

| | | | | |
|---|---|---|---|---|
| 5,022,745 A | * | 6/1991 | Zayhowski et al. | 359/847 |
| 5,363,391 A | * | 11/1994 | Matthews et al. | 372/36 |
| 5,796,766 A | * | 8/1998 | Hargis et al. | 372/36 |

(Continued)

FOREIGN PATENT DOCUMENTS

JP    64-39669    3/1989

(Continued)

*Primary Examiner*—Minsun Harvey
*Assistant Examiner*—Phillip Nguyen
(74) *Attorney, Agent, or Firm*—Drinker Biddle & Reath LLP

(57) ABSTRACT

The present invention relates to a solid-state laser module, and so on, having a structure for enabling optical output of high quality to be obtained. The solid-state laser module includes a vacuum container with windows, and a heat sink, a solid-state laser medium, and a pair of transparent members are housed in the vacuum container in an integrally assembled state. The solid-state laser medium and the pair of transparent members respectively have disk shapes, and the pair of transparent members sandwich the solid-state laser medium. The thermal conductivity of each of the pair of transparent members is higher than the thermal conductivity of the solid-state laser medium. The heat sink has a shape that simultaneously clamps portions of the pair of transparent members that sandwich the solid-state laser medium in between, and a heat insulating region, with a thermal conductivity that is lower than the thermal conductivity of the solid-state laser medium, is provided between the heat sink and the solid-state laser medium.

8 Claims, 9 Drawing Sheets

U.S. PATENT DOCUMENTS

| | | | | |
|---|---|---|---|---|
| 5,982,792 | A * | 11/1999 | Kasamatsu et al. | 372/35 |
| 6,141,143 | A | 10/2000 | Marshall | |
| 6,385,220 | B1 * | 5/2002 | Miller et al. | 372/34 |
| 2002/0110166 | A1 * | 8/2002 | Filgas | 372/36 |

FOREIGN PATENT DOCUMENTS

| | | |
|---|---|---|
| JP | 1-289180 | 11/1989 |
| JP | 2-246388 | 10/1990 |
| JP | 6-105809 | 12/1994 |
| JP | 8-32153 | 2/1996 |
| JP | 9-507725 | 8/1997 |
| JP | 2000-77750 | 3/2000 |
| JP | 2000-124533 | 4/2000 |
| JP | 3146660 | 1/2001 |
| JP | 2001-68768 | 3/2001 |
| JP | 2002-57388 | 2/2002 |
| JP | 2002-198596 | 7/2002 |
| JP | 2003-507899 | 2/2003 |
| JP | 2004-521490 | 7/2004 |

* cited by examiner

SOLID LASER MODULE, OPTICAL AMPLIFIER, AND LASER OSCILLATOR

TECHNICAL FIELD

The present invention relates to a solid-state laser module that includes a solid-state laser medium, in the interior of which an emission light is generated by illumination of pumping light, as well as to an optical amplifier that includes the solid-state laser module and a laser oscillator that includes the solid-state laser module.

BACKGROUND ART

In an optical amplifier that includes a solid-state laser medium, an active element (such as a rare earth element or a transition metal element), contained in the solid-state laser medium, is pumped by illumination of the pumping light outputted from a pumping light source. In this process, emission light with a predetermined wavelength is generated by a stimulated emission phenomenon inside the solid-state laser medium. A laser oscillator is constituted by such an optical amplifier and an oscillator. For example, when the solid-state laser medium is Yb-doped YAG, the pumping light source is a laser diode and the wavelength of the light that can be amplified is 1030 nm.

In an optical amplifier or a laser oscillator with such a structure, the solid-state laser medium generates heat during operation. The solid-state laser medium must thus be heat-released or cooled to achieve stable operation and obtain a high-quality optical output. For example, a laser oscillator disclosed in a Patent Document 1 includes a solid-state laser module constituted by a polycrystalline transparent ceramic that does not contain an active element, a solid-state laser medium (a polycrystalline transparent ceramic doped with an active element) that is in contact with the polycrystalline transparent ceramic, and a heat sink disposed so as to hold these components simultaneously. In the solid-state laser module with this arrangement, the heat generated at the solid-state laser medium propagates through the polycrystalline transparent ceramic, which does not contain the active element, and the heat sink, and temperature rise of the solid-state laser medium is thereby suppressed.

Patent Document 1: Japanese Patent Application Laid-Open No. 2002-57388

DISCLOSURE OF THE INVENTION

Problems that the Invention is to Solve

As a result of examining the conventional arts described above, the present inventors found the following problem. That is, even with the laser oscillator disclosed in the Patent Document 1, the heat release or cooling of the solid-state laser medium is inadequate and there are cases where an optical output of high quality cannot be obtained.

The present invention has been made to resolve the above problem, and an object thereof is to provide a solid-state laser module that has a structure for enabling an optical output of high quality to be obtained, an optical amplifier that includes the solid-state laser module, and a laser oscillator that includes the solid-state laser module.

Means for Solving the Problems

A solid-state laser module according to the present invention comprises a solid-state laser medium, first and second members provided so as to directly sandwich the solid-state laser medium, a heat sink, and a heat insulating region provided between the solid-state laser medium and the heat sink.

The solid-state laser medium is doped with an active element, that is pumped by the pumping light with a first wavelength, and an emission light with a second wavelength is emitted into the interior of the solid-state laser medium in response to illumination of the pumping light. The first member is provided in a state of being in direct contact with a first main surface of the solid-state laser medium. The first member is comprised of a material transparent to both the pumping light and the emission light, and then has a higher thermal conductivity than the solid-state laser medium. The second member is provided in a state of being in direct contact with a second main surface of the solid-state laser medium that opposes the first main surface. The second member is comprised of a material transparent to both the pumping light and the emission light, and then has a higher thermal conductivity than the solid-state laser medium. The heat sink is provided so as to clamp at least a portion of each of the first and second members which sandwich the solid-state laser medium there between, in a state of being separated by a predetermined distance from the solid-state laser medium. The heat insulating region is provided between the heat sink and side surfaces of the solid-state laser medium that communicates between the first second main surfaces, and then has a lower thermal conductivity than the solid-state laser medium. The heat insulating region, provided between the solid-state laser medium and the heat sink, may be a solid, a liquid, air or other gas, or vacuum.

Furthermore, a surface of the first member, at least a portion of which is in contact with the first main surface of the solid-state laser medium, preferably has a wider area than the first main surface. Likewise, a surface of the second member, at least a portion of which is in contact with the second main surface of the solid-state laser medium, preferably has a wider area than the second main surface. By this arrangement, the first and second members function as spacers for defining the interval between the side surfaces of the solid-state laser medium and the heat sink.

Preferably, the solid-state laser module according to the present invention furthermore comprises a cooling device for cooling the heat sink. A heating device for heating the heat sink may furthermore be provided. The solid-state laser module according to the present invention may furthermore have a sealed container, the interior of which is pressure-reduced to a predetermined degree of vacuum. This sealed container has a space that houses at least the solid-state laser medium, the first member, and the second member, and preferably has windows for transmitting the pumping light and the emission light therethrough.

In the solid-state laser module according to the present invention, the first and second members, provided in states of directly contacting the first and second main surfaces, respectively, of the solid-state laser medium, are both higher in thermal conductivity than the solid-state laser medium. The heat insulating region, provided between the side surfaces of the solid-state laser medium and the heat sink, has a lower thermal conductivity than the solid-state laser medium. The heat that is generated by the pumping light illumination into the solid-state laser medium is thus transmitted to the members in contact with the respective main surfaces of the solid-state laser medium, and that is furthermore conducted to the heat sink. Meanwhile, the amount of heat conducted from the side surfaces of the solid-state laser medium to the heat sink side is slight. A thermal lens effect, due to illumination of the pumping light onto the solid-state laser medium, is thus reduced, and disturbance of the wavefront of the stimulated emission light outputted from the solid-state laser medium is suppressed effectively. As a result, an optical output of high quality can be obtained. Also, in a case where a cooling device for cooling the heat sink or a heating device for heating the heat sink is provided, because the temperature of the solid-state laser medium is thereby set appropriately, optical amplification in the solid-state laser medium can be carried out under favorable conditions. Also, in a case where a vacuum container that houses the solid-state laser medium, and so on, in its interior is provided, dew condensation on the solid-state laser medium, and so on, is prevented.

An optical amplifier according to the present invention comprises the solid-state laser module with the above-described structure (the solid-state laser module according to the present invention), and a pumping light source for illuminating the pumping light onto the solid-state laser medium included in the solid-state laser module. In this optical amplifier, the active element inside the solid-state laser medium is pumped by the pumping light illuminated from the pumping light source. Light with a predetermined wavelength, which enters the solid-state laser medium while the active element is thus pumped, is amplified in the solid-state laser medium. In this optical amplifier, because the solid-state laser module, including the solid-state laser medium, has the above-described structure, amplified light of high quality and high output can be obtained.

A laser oscillator according to the present invention comprises the solid-state laser module with the above-described structure (the solid-state laser module according to the present invention), a pumping light source that illuminates the pumping light onto the solid-state laser medium included in the solid-state laser module, and a resonator, with which the solid-state laser medium included in the solid-state laser module is arranged along a resonance optical path. In this laser oscillator, by the pumping light illuminated from the pumping light source pumping the active element inside the solid-state laser medium, a stimulated emission phenomenon occurs inside the solid-state laser medium. By the stimulated emission light that is generated in this process reciprocating along the resonance optical path of the resonator, a laser light can be obtained from the oscillator. In this laser oscillator, because the solid-state laser module, including the solid-state laser medium, has the above-described structure, laser light of high quality and high output can be obtained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

In accordance with the solid-state laser module according to the present invention, because a structure that enables appropriate temperature control of the solid-state laser medium is provided, optical output of high quality and high power can be obtained from an optical amplifier, laser oscillator, etc., to which the solid-state laser module is applied.

DESCRIPTION OF THE REFERENCE NUMERALS

Figure 1:
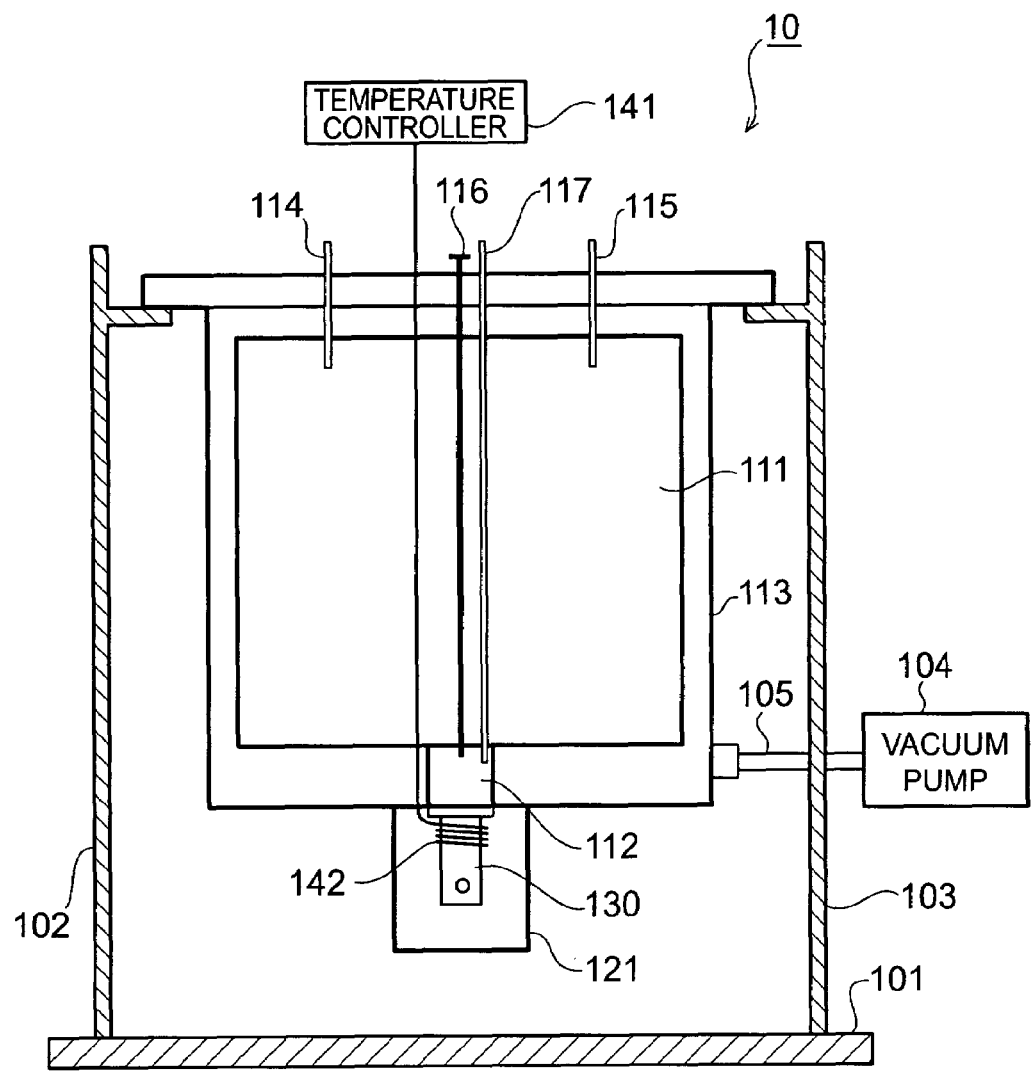
FIG. 1 is a diagram of an overall arrangement of an embodiment of a solid-state laser module according to the present invention.

1 . . . optical amplifier; 2, 3 . . . laser oscillator; 10 . . . solid-state laser module; 10A . . . solid-state laser module major portion; 11a, 11b . . . laser diode; 12a, 12b . . . optical fiber; 13a, 13b . . . exit end; 14a, 14b . . . lens system; 15a, 15b . . . mirror; 21 . . . rear mirror; 22 . . . output mirror; 31 . . . ½ wave plate; 32 . . . polarizing plate; 32 . . . Pockel's cell; 34 . . . mirror; 101 . . . base; 102, 103 . . . supporting portion; 104 . . . vacuum pump; 105 . . . exhaust tube; 111 . . . first liquid nitrogen storage tank; 112 . . . second liquid nitrogen storage tank; 113 . . . cooler outer wall; 114, 115 . . . liquid nitrogen inlet; 116 . . . needle valve; 117 . . . exhaust outlet; 121 . . . vacuum container; 122, 123 . . . window; 130 . . . heat sink; 131 . . . heat sink main body; 132 . . . retainer plate; 133, 134, 135 . . . screw hole; 136, 137 . . . penetrating hole; 138 . . . internal space; 141 . . . temperature controller; 142 . . . heater; 143 . . . thermocouple; 151 . . . solid state laser medium; 152, 153 . . . transparent member; 154, 155 . . . indium foil; and 156 . . . heat insulating member.

BEST MODES FOR CARRYING OUT THE INVENTION

In the following, embodiments of a solid-state laser module, an optical amplifier, and a laser oscillator according to the present invention will now be explained in detail with reference to FIGS. 1 to 11. In the description of the drawings, identical or corresponding components are designated by the same reference numerals, and overlapping description is omitted. The dimensional proportions in the drawings do not necessarily match those of the description, and the dimensions, materials, etc., of the respective elements are simply examples.

An embodiment of a solid-state laser module according to the present invention will first be explained. FIG. 1 is a diagram of an arrangement of the embodiment of the solid-state laser module according to the present invention. The solid-state laser module 10 shown in FIG. 1 is supported by a base 101 and supporting portions 102, 103, and comprises a vacuum pump 104, a first liquid nitrogen storage tank 111, a second liquid nitrogen storage tank 112, a cooler outer wall 113, a vacuum container 121, a heat sink 130, a temperature controller 141, and so on. The vacuum container 121 means as a sealed container, the interior of which is pressure-reduced to a predetermined degree of vacuum. Major portions of the solid-state laser module 10 housed inside the vacuum container 121 will be explained later.

The cooler outer wall 113 is supported by the supporting portions 102, 103 that are fixed to the base 101. The cooler outer wall 113 is comprised, for example, of stainless steel, and in the interior thereof, the first liquid nitrogen storage tank 111 and the second liquid nitrogen storage tank 112 are disposed. The first liquid nitrogen storage tank 111 is fixed to an upper lid of the cooler outer wall 113 and is provided with liquid nitrogen inlets 114, 115 that penetrate through the upper lid. Liquid nitrogen is injected into the interior or gasified nitrogen is discharged to the exterior via these liquid nitrogen inlets 114, 115.

The second liquid nitrogen storage tank 112 is disposed below the first liquid nitrogen storage tank 111 and is put in communication with the first liquid nitrogen storage tank 111 via a microhole, into which a tip of the needle valve 116 is inserted. While the tip of the needle valve 116 is inserted into the microhole and the microhole is closed, the second liquid nitrogen storage tank 112 is separated from the first liquid nitrogen storage tank 111. On the other hand, while the tip of the needle valve 116 is not inserted into the microhole, the second liquid nitrogen storage tank 112 is in communication with the first liquid nitrogen storage tank 111 and the liquid nitrogen in the interior of the first liquid nitrogen storage tank 111 is injected into the interior of the second liquid nitrogen storage tank 112. The injection amount in this process can be adjusted by the position of the needle valve 116. The second liquid nitrogen storage tank 112 is also provided with an exhaust outlet 117, and gasified nitrogen is discharged to the exterior via this exhaust outlet 117.

The vacuum container 121 and the heat sink 130 are disposed below the second liquid nitrogen storage tank 112. Major portions of the solid-state laser module 10, including the heat sink 130, are disposed in the interior of the vacuum container 121. An internal space is provided in the heat sink 130, and this internal space is put in communication with an internal space of the second liquid nitrogen storage tank 112. By liquid nitrogen flowing into the internal space of the heat sink 130, the heat sink 130 is cooled. The heat sink 130 is provided with a heater 142 and a thermocouple, and this heater 142 and the thermocouple are connected to the temperature controller 141. The temperature controller 141 monitors the temperature of the heat sink 130 that is measured by the thermocouple or passes electricity through the heater 142 to raise the temperature of the heat sink 130.

A space between the cooler outer wall 113 and the first and second liquid nitrogen storage tanks 111, 112 is in communication with an internal space of the vacuum container 121 and is connected to the vacuum pump 104 via an exhaust tube 105. By these spaces being maintained at vacuum (the predetermined degree of vacuum) by means of the vacuum pump 104, dew condensation during cooling by liquid nitrogen is prevented. The first liquid nitrogen storage tank 111 and the second liquid nitrogen storage tank 112 are also insulated thereby.

Figure 2:
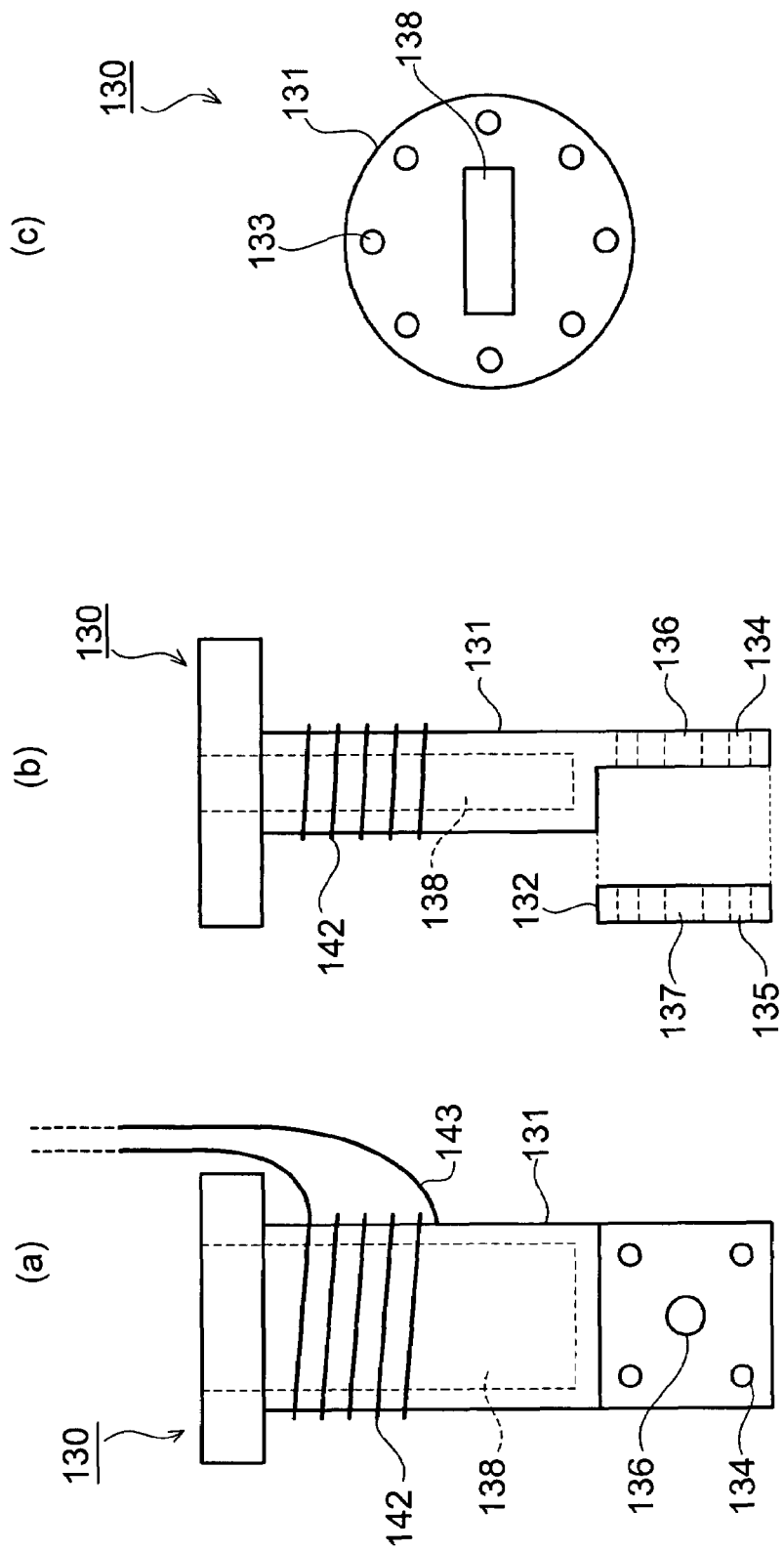
FIG. 2 shows diagrams of an arrangement of a heat sink included in the embodiment of the solid-state laser module according to the present invention.

FIG. 2 shows diagrams of an arrangement of the heat sink included in the embodiment of the solid-state laser module according to the present invention. In FIG. 2, the area (a) shows a front view of the heat sink 130, the area (b) shows a side view of the heat sink 130, and the area (c) shows a plan view of the heat sink 130. The heat sink 130 is constituted by a heat sink main body 131 and a retainer plate 132. The heat sink main body 131 has a substantially rectangular portion and a cylindrical upper portion, and then eight screw holes 133 are provided in the cylindrical upper portion. By this arrangement, the heat sink main body 131 is screwed onto a bottom surface of the second liquid nitrogen storage tank 112. Here, in order to heighten the degree of close adhesion between the cylindrical upper portion of the heat sink main body 131 and the bottom surface of the second liquid nitrogen storage tank 112 (to improve the thermal conduction), for example, an indium foil of 100 μm thickness is preferably sandwiched between them. In this case, the indium foil is a component of the heat sink 130.

At a lower side of the substantially rectangular portion of the heat sink main body 131 are provided four screw holes 134 and a penetrating hole 136. Meanwhile, the retainer plate 132 is also provided with four screw holes 135 and a penetrating hole 137. The heat sink main body 131 and the retainer plate 132 are fixed together by screws by means of the screw holes 134, 135. These components are fixed together by screws so that the penetrating holes 136, 137 overlap with each other at the same position and, in this state, the solid-state laser medium, and so on, are sandwiched by the heat sink main body 131 and the retainer plate 132.

The heater 142 is wound around and the thermocouple 143 is disposed at a periphery of the heat sink main body 131. The heater 142 and the thermocouple 143 are connected to the temperature controller 141. An internal space 138, an upper portion of which is open, is provided in the heat sink main body 131. When the heat sink main body 131 is screwed onto the bottom surface of the second liquid nitrogen storage tank 112, the internal space 138 of the heat sink main body 131 is put in communication with the internal space of the second liquid nitrogen storage tank 112 and liquid nitrogen can flow in from the second liquid nitrogen storage tank 112.

The heat sink main body 131 and the retainer plate 132 are preferably comprised of a medium of high thermal conductivity, such as copper or other metal. The cylindrical upper portion of the heat sink main body 131 has, for example, a diameter of 40 mm and a thickness of 5 mm. Meanwhile, a lower side of the rectangular lower portion of the heat sink main body 131 has, for example, a vertical length of 50 mm, a width of 15 mm, and a thickness of 7 mm. The retainer plate 132 has a shape, for example, of 15 mm×15 mm×thickness of 2 mm. The penetrating holes 136, 137 have, for example, a circular shape of 2 mm diameter. The upper open portion of the internal space 138 has, for example, a rectangular shape of 10 mm×3 mm. The heater 142 is formed, for example, of the electrically resistive alloy, manganin, and the maximum supply power thereof is 40 W. By cooling by the liquid nitrogen and the heating by the heater 142, the temperature of the heat sink 130 can be set in a range, for example, of 77K to 300K.

Figure 3:
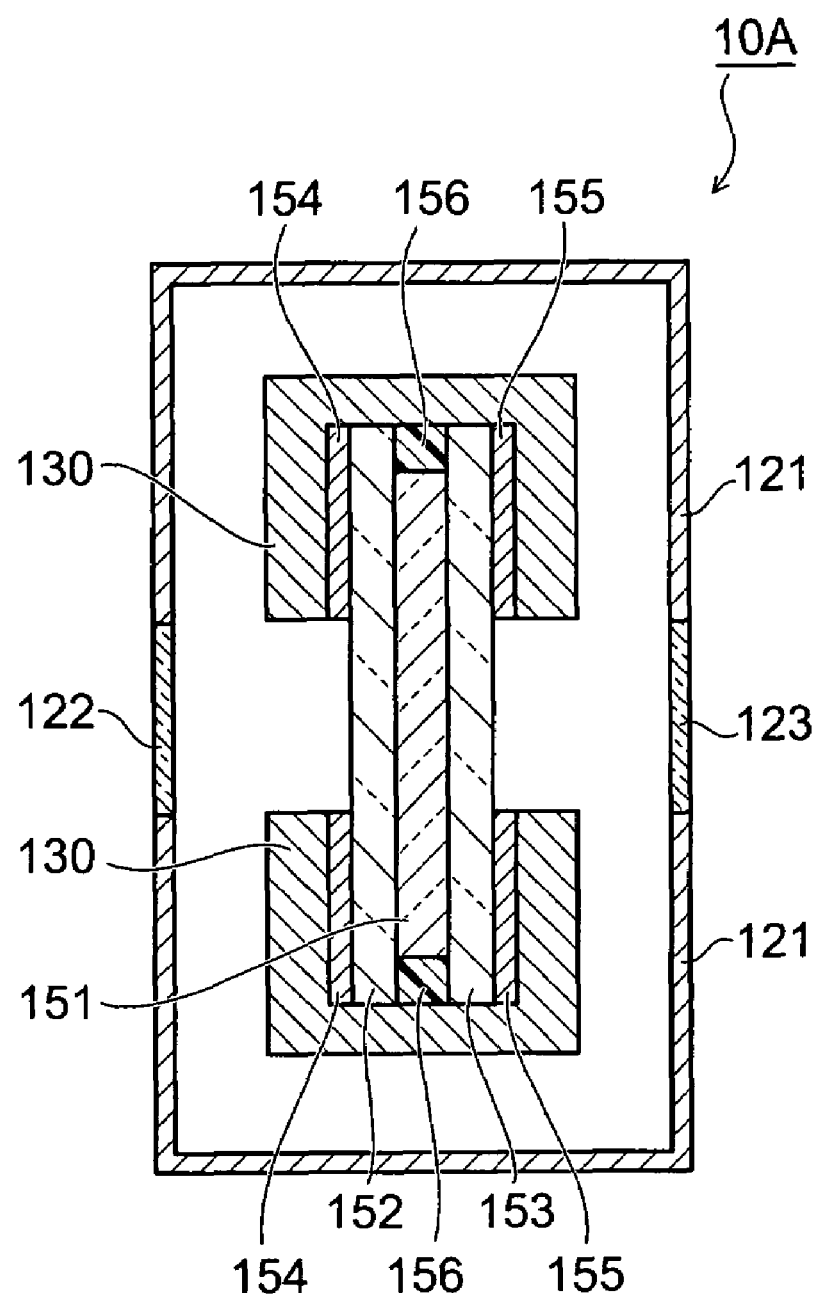
FIG. 3 is a sectional view of an arrangement of a major portion of the embodiment of the solid-state laser module according to the present invention.
Figure 4:
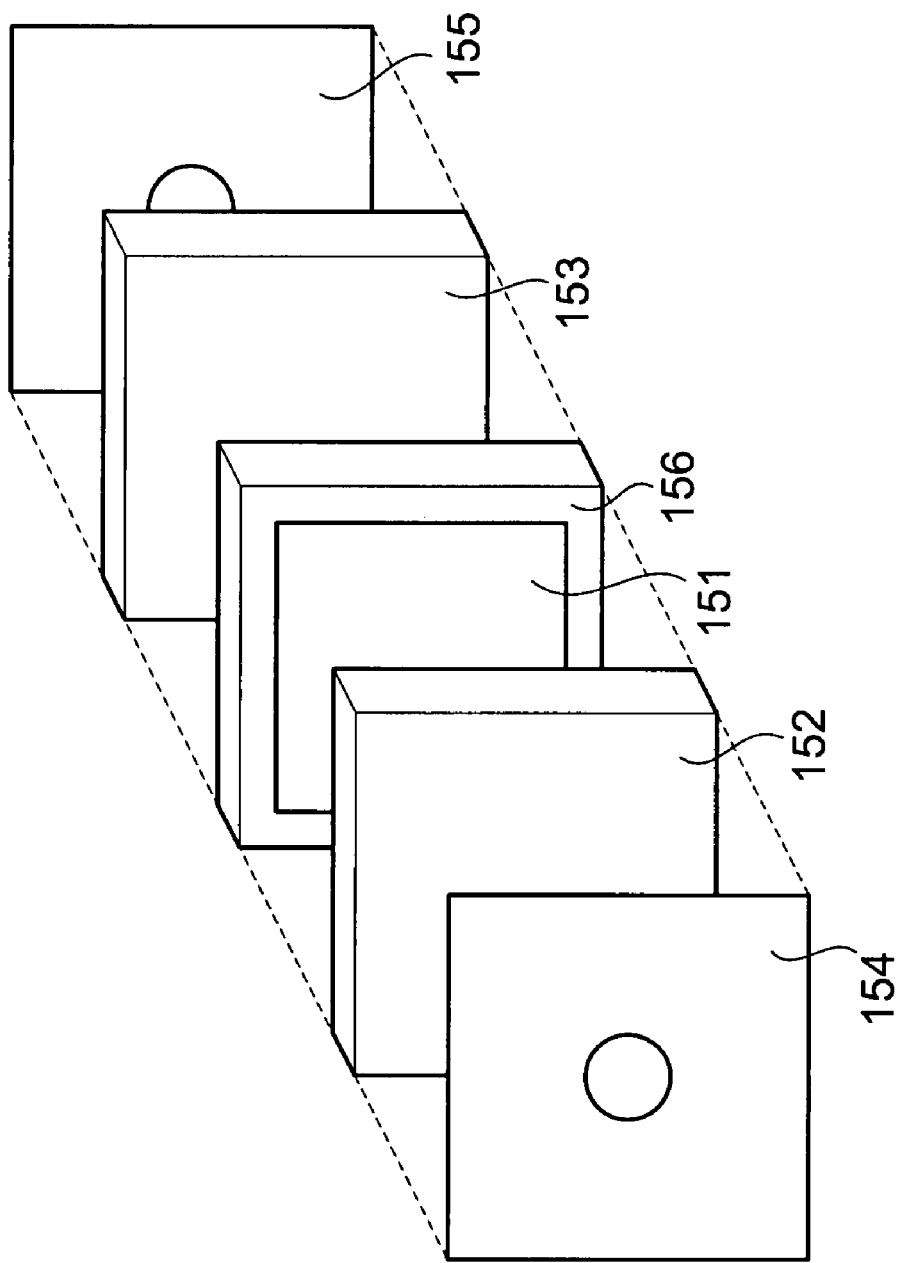
FIG. 4 is an assembly process diagram for explaining the arrangement of the major portion of the embodiment of the solid-state laser module according to the present invention.

FIG. 3 is a sectional view of a structure of a major portion of the solid-state laser module according to the present invention. In FIG. 3, a section, containing central axes of the penetrating holes 136, 137 shown in FIG. 2, is shown. FIG. 4 is an assembly process diagram of the arrangement of the major portion of the solid-state laser module according to the present invention. In the major portion of the solid-state laser module, the heat sink 130, a solid-state laser medium 151, a first member 152, a second member 153, an indium foil 154, an indium foil 155, and a heat insulating member 156 are housed in the interior of the vacuum container 121 with windows 122, 123. The indium foil 154, the first member 152, the solid-state laser medium 151, the second member 153, and the indium foil 155 respectively have disk-like shapes and are layered in this order. An opening is provided in a center of each of the indium foils 154, 155.

The solid-state laser medium 151 has a first main surface, and a second main surface that opposes the first main surface and that is doped with an active element to be pumped by the pumping light with a predetermined wavelength. In this solid-state laser medium 151, stimulated emission light is generated in the interior upon illumination of the pumping light. The first member 152 is disposed in a state of being in direct contact with the first main surface of the solid-state laser medium 151, and the second member 153 is disposed in a state of being in direct contact with the second main surface of the solid-state laser medium 151. Of the respective main surfaces of the solid-state laser medium 151, the first member 152 and the second member 153, as the main surfaces which are in contact with each other, are preferably optically polished to improve close adhesion to each other. The first and second members 152, 153 are not doped with an active element and are comprised of a material transparent to both the pumping light and the stimulated emission light. The first and second members 152, 153 will be referred to below as "transparent members." The windows 122, 123 can also transmit both the pumping light and the stimulated emission light. A dielectric multilayer film filter, for lowering the reflection at the respective wavelengths of the pumping light and the stimulated emission light, is preferably formed on each of the respective main surfaces of the transparent members 152, 153 and the windows 122, 123.

At four side surfaces of the solid-state laser medium 151, the heat insulating member 156 is disposed so as to become in direct S contact with the four side surfaces as a heat insulating region disposed between the side surfaces and the heat sink 130. The heat sink 130 has a shape that is in contact with the respective main surfaces and the side surfaces of the transparent member 152 and the transparent member 153 without being in contact with the solid-state laser medium 151. Preferably in order to improve the degree of close adhesion (to improve the thermal conductivity) between the transparent members 152, 153, the indium foil 154 with a thickness, for example, of 100 μm is disposed between the transparent member 152 and the heat sink 130, and then the indium foil 155 with a thickness, for example, of 100 μm is disposed between the transparent member 153 and the heat sink 130. In this case, the indium foils 154, 155 constitute a portion of the heat sink 130.

The thermal conductivity of each of the transparent members 152, 153 is higher than the thermal conductivity of the solid-state laser medium 151. The thermal conductivity of the heat insulating member 156, disposed between the side surfaces of the solid-state laser medium 151 and the heat sink 130, is lower than the thermal conductivity of the solid-state laser medium 151.

The solid-state laser medium 151 is comprised, for example, of YAG doped with Yb element of 25 at %, and has dimensions of 3 mm×3 mm×0.8 mm. Each of the transparent members 152, 153 is comprised, for example, of sapphire glass, and then has dimensions of 6 mm×6 mm×1.5 mm. The opening of each of the indium foils 154, 155 has, for example, a circular shape with a diameter of 2 mm. The heat insulating member 156 is comprised, for example, of a resin, such as Teflon (registered trademark), and so on, and then has a width of 1 mm and a thickness of 0.8 mm. The heat insulating member 156 is adhered onto the side surfaces of the solid-state laser medium 151 by silicone potting.

When the overall dimensions of the main surfaces of the solid-state laser medium 151 and the heat insulating member 156 (5 mm×5 mm in the above-described example) are too small as compared with the dimensions of the main surfaces of the transparent members 152, 153 (6 mm×6 mm in the above-described example), a gap may form between the components due to thermal strain. In this case, the efficiency of thermal conduction from the solid-state laser medium 151 to the transparent members 152, 153 drops. The main surface dimensions of the transparent members 152, 153 are thus preferably approximately the same as the overall main surface dimensions of the solid-state laser medium 151 and the heat insulating member 156.

In the solid-state laser module 10 with the above-described structure, liquid nitrogen is injected into the first liquid nitrogen storage tank 111 from the liquid nitrogen inlets 114, 115, and by adjustment of the needle valve 116, the liquid nitrogen is injected into the second liquid nitrogen storage tank 112 from the first liquid nitrogen storage tank 111. The liquid nitrogen that has been injected into the second liquid nitrogen storage tank 112 furthermore flows into the internal space 138 of the heat sink 130 and the heat sink 130 is thereby cooled. The heat sink 130 is heated by the heater 142.

The pumping light for pumping the active element contained in the solid-state laser medium 151 is made incident perpendicular to the main surfaces of the solid-state laser medium 151. The light to be amplified in the solid-state laser medium 151 is also made incident perpendicular to the main surfaces of the solid-state laser medium 151. The stimulated emission light generated inside the solid-state laser medium 151 is emitted perpendicular to the main surfaces of the solid-state laser medium 151. The pumping light, amplified light, and stimulated emission light pass through the penetrating holes 136, 137 of the heat sink 130, pass through the openings of the indium foils 154, 155 and then pass through the transparent members 152, 153.

When the pumping light is illuminated onto the solid-state laser medium 151, a portion of the energy of the pumping light is consumed to pump the active element, and the remaining portion causes a temperature rise in the solid-state laser medium 151. The heat generated in the solid-state laser medium 151 in this process is conducted to the transparent members 152, 153 in contact with the respective main surfaces of the solid-state laser medium 151, and then is furthermore conducted to the heat sink 130 via the indium foils 154, 155. Meanwhile, because the heat insulating member 156 of low thermal conductivity is disposed at the side surfaces of the solid-state laser medium 151, the amount of heat that is conducted toward the heat insulating member 156 from the side surfaces of the solid-state laser medium 151 is slight.

At room temperature (300K), the thermal conductivity (20 W/m·K) of sapphire glass, as an example of the transparent members 152, 153, is approximately the same as the thermal conductivity (12 W/m·K) of Yb:YAG, which is an example of the solid-state laser medium 151. However, at a low temperature (77K), the thermal conductivity (1000 W/m·K) of sapphire glass, as an example of the transparent members 152, 153, is about two orders of magnitude greater than the thermal conductivity at room temperature (300K). In order to utilize such characteristics of the transparent members 152, 153, the heat sink 130 is cooled by liquid nitrogen and furthermore, the solid-state laser medium 151 and the transparent members 152, 153 are conduction-cooled. Thus, as compared with a case of directly cooling the solid-state laser medium 151 without providing the transparent members 152, 153, the heat generated in the solid-state laser medium 152 is discharged more effectively when the solid-state laser medium 151 is cooled via the transparent members 152, 153 of high heat conductivity.

Figure 5:
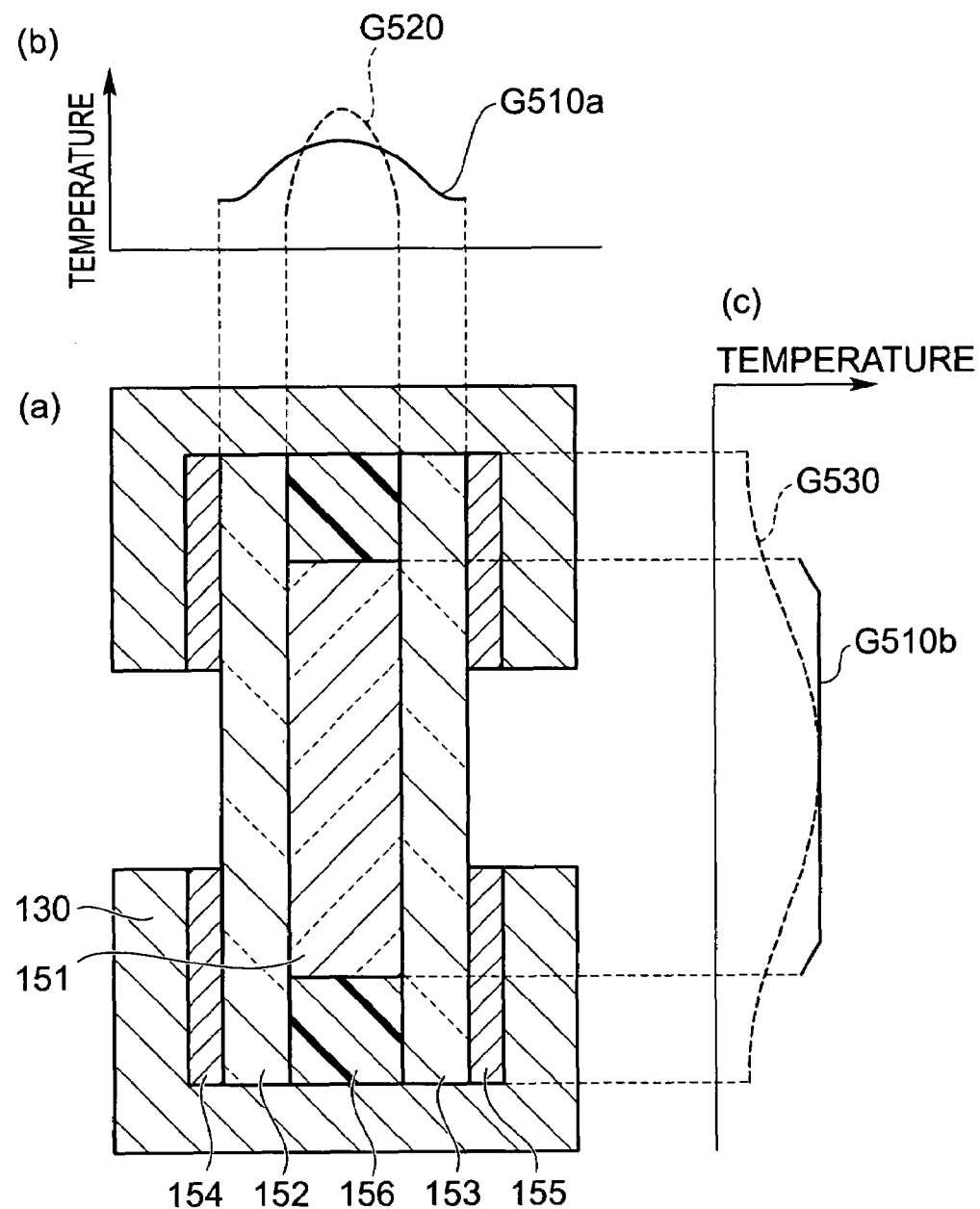
FIG. 5 shows operation temperature distributions of a solid-state laser medium included in the embodiment of the solid-state laser module according to the present invention.

FIG. 5 shows temperature distributions during usage of the solid-state laser medium 151 included in the solid-state laser module 10 according to the present invention. In FIG. 5, the area (a) shows is a sectional view of the structure of the major portions of the solid-state laser module 10, the area (b) shows temperature distributions along an optical axis of the solid-state laser medium 151, and the area (c) shows temperature distributions in a direction perpendicular to the optical axis of the solid-state laser medium 151. In the area (b) of FIG. 5, a temperature distribution during usage of the solid-state laser module 10 according to the present embodiment is indicated by a graph G510a (solid line), and a temperature distribution during usage of a solid-state laser module according to a first comparative example is indicated by a graph G520 (broken line). In the area (c) of FIG. 5, a temperature distribution during usage of the solid-state laser module 10 according to the present embodiment is indicated by a graph G510b (solid line), and a temperature distribution during usage of a solid-state laser module according to a second comparative example is indicated by a graph G530 (broken line). The first comparative example, corresponding to the graph G520 shown in the area (b) of FIG. 5, is not provided with the transparent members 152, 153 and the main surfaces of the solid-state laser medium 151 are in direct contact with the heat sink 130. The second comparative example, corresponding to the graph G530 shown in the area (c) of FIG. 5, is not provided with the heat insulating member 156 and the side surfaces of the solid-state laser medium 151 are in direct contact with the heat sink 130.

As can be seen from the area (b) of FIG. 5, in comparison to the first comparative example, in which the main surfaces of the solid-state laser medium 151 are in contact with the heat sink 130, the temperature distribution along the optical axis of the solid-state laser medium 151 is low in peak value and small in variation with the present embodiment, in which the transparent members 152, 153 of high thermal conductivity are disposed between the main surfaces of the solid-state laser medium 151 and the heat sink 130. Meanwhile, as can be seen from the area (c) of FIG. 5, in comparison to the second comparative example, in which the side surfaces of the solid-state laser medium 151 are in contact with the heat sink 130, the temperature distribution in the direction perpendicular to the optical axis of the solid-state laser medium 151 is made uniform with the present embodiment, in which the heat insulating member 156 of low thermal conductivity is disposed between the side surfaces of the solid-state laser medium 151 and the heat sink 130.

Figure 6:
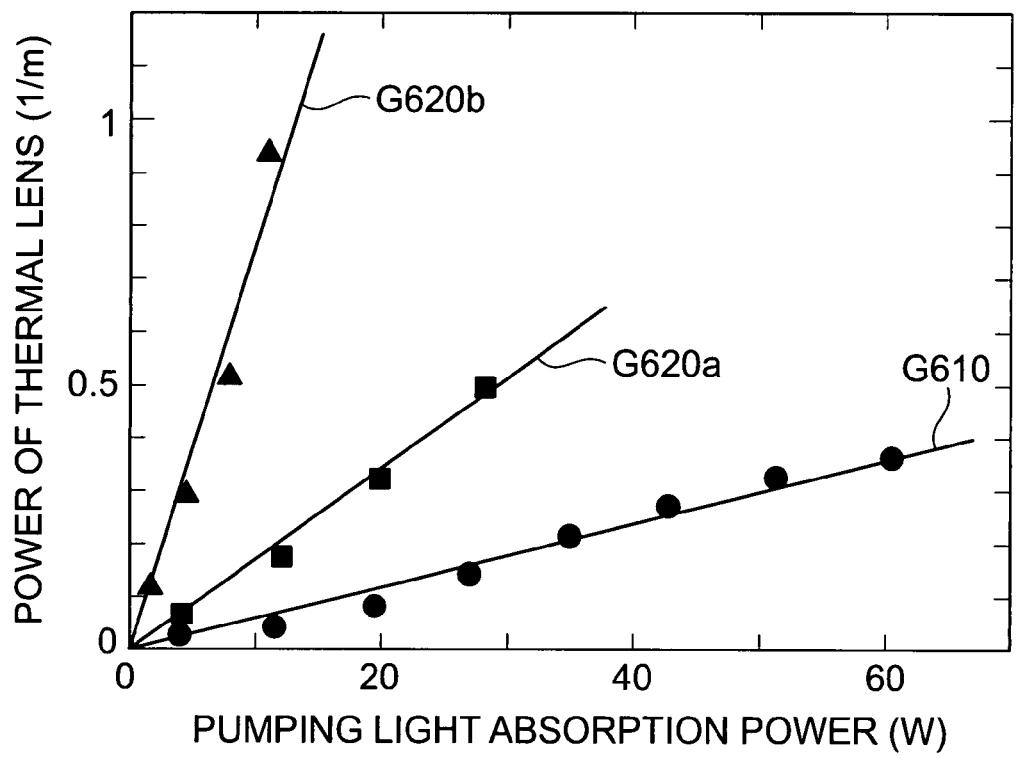
FIG. 6 is a diagram of a relationship between pumping light absorption power and thermal lens power of the solid-state laser medium included in the embodiment of the solid-state laser module according to the present invention.

FIG. 6 is a diagram showing a relationship between pumping light absorption power and thermal lens power (reciprocal of the focal length) of the solid-state laser medium 151 included in the solid-state laser module according to the present invention, along with those of a comparative example. In FIG. 6, the graph G610 shows the relationship at a low temperature (80K) of the solid-state laser medium 151 according to the present embodiment and is approximated by a straight line, $y=0.0061x$, with the thermal lens power (1/m) being taken along the y-axis and the pumping light absorption power (W) taken along the x-axis. The graph G620a shows the relationship at the low temperature (80K) of the solid-state laser medium according to the first comparative example and is approximated by a straight line, $y=0.017x$. The graph G620b shows the relationship at room temperature (300K) of the solid-state laser medium according to the first comparative example and is approximated by a straight line, $y=0.078x$. As shown in FIG. 6, in comparison to the respective relationships at room temperature and low temperature of the first comparative example, the thermal lens effect, due to illumination of the pumping light onto the solid-state laser medium 151, is reduced, and the heat gradient along a direction perpendicular to the optical axis of the solid-state laser medium 151 is suppressed at approximately ⅓ with the solid-state laser module 10 according to the embodiment. Optical output of high quality can thus be obtained with an optical amplifier or laser oscillator, to which the solid-state laser module 10 according to the present embodiment is applied.

Also, because in the present embodiment, the solid-state laser medium 151 is cooled with the solid-state laser medium 151 being sandwiched by the transparent members 152, 153, the upper limit of the thickness of the solid-state laser medium 151 due to the thermal destruction limit is made approximately 4 times that of the case of cooling from just one of the main surfaces. Thus, when there is no restriction due to parasitic oscillation, the volume of the solid-state laser medium 151 can be increased by 4 times to enable a large amount of energy to be accumulated in the solid-state laser medium 151 and to enable realization of an optical amplifier or a laser oscillator of high gain and high output. This also leads to simplification of the arrangement of an optical amplifier or a laser oscillator and can contribute to making these devices compact.

Figure 7:
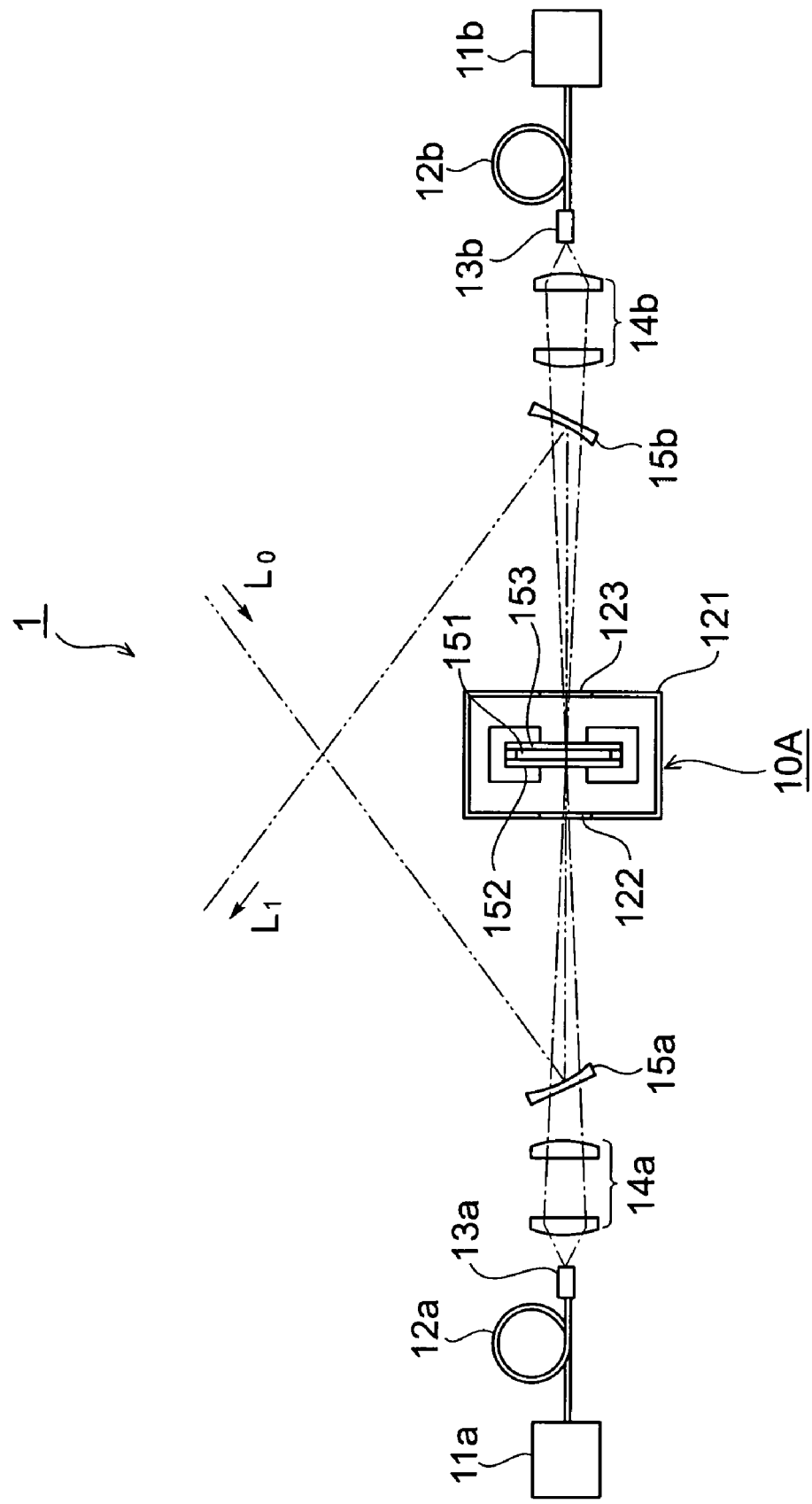
FIG. 7 is a diagram of an arrangement of an embodiment of an optical amplifier according to the present invention.

An embodiment of an optical amplifier according to the invention will now be explained. FIG. 7 is a diagram of an arrangement of the embodiment of the optical amplifier according to the present invention. The optical amplifier 1 shown in FIG. 7 comprises the solid-state laser module 10 with the above-described structure. However, in FIG. 7, only a major portion 10A of the solid-state laser module 10 is shown. This optical amplifier 1 also includes laser diodes 11a, 11b, optical fibers 12a, 12b, lens systems 14a, 14b, and mirrors 15a, 15b.

Each of laser diodes 11a, 11b outputs pumping light with a wavelength that can pump the active element contained in the solid-state laser medium 151 of the major portion 10A of the solid-state laser module 10. The optical fiber 12a transmits the pumping light outputted from the laser diode 11a and emits this pumping light to the exterior from an exit end 13a. The lens system 14a makes the pumping light, emitted from the exit end 13a, converge onto the solid-state laser medium 151. The optical fiber 12b transmits the pumping light outputted from the laser diode 11b and emits this pumping light to the exterior from an exit end 13b. The lens system 14b makes the pumping light, emitted from the exit end 13b, converge onto the solid-state laser medium 151. The pumping light that is made incident on the solid-state laser medium 151 from the lens system 14a and the pumping light that is made incident on the solid-state laser medium 151 from the lens system 14b are opposite in the respective incidence directions. The lens systems 14a, 14b are comprised of material having a high transmittance at the pumping wavelength, and dielectric multilayer film filters, for reducing the reflectance at the pumping wavelength, are preferably formed on the lens surfaces.

The mirror 15a is disposed along the optical path of the pumping light between the major portion 10A of the solid-state laser module 10 and the lens system 14a. The mirror 15b is disposed along the optical path of the pumping light between the major portion 10A of the solid-state laser module 10 and the lens system 14b. With each of the mirrors 15a, 15b, a surface facing the major portion 10A of the solid-state laser module 10 is a concave surface and this concave surface reflects the stimulated emission light generated inside the solid-state laser medium 151 while transmitting the pumping light. In order to provide such transmission and reflection characteristics, a dichroic coating is applied to the concave surface of each of the mirrors 15a, 15b.

For example, when the solid-state laser medium 151 is Yb:YAG, the pumping wavelength is 940 nm, and the stimulated emission wavelength is 1030 nm, specific examples of the respective components are as follows. That is, the laser diodes 11a, 11b have an output wavelength of 940 nm and a maximum output power of 140 W. Each of the lens systems 14ab, 14b has a dielectric multilayer film filter formed thereon such that the transmittance, for example, at 940 nm is 99.6% and has a structure in which two planoconvex lenses are combined. The radius of curvature of a convex reflecting surface of one of the planoconvex lenses is 150 nm, and radius of curvature of a convex reflecting surface of the other planoconvex lenses is 300 nm. By this lens arrangement, the beam diameter of the pumping light in the solid-state laser medium 151 can be narrowed down to 180 μm. In each of the mirrors 15a and 15b, the radius of curvature of the concave reflective surface is 100 nm, the transmittance at the pumping wavelength is 97.6%, and the reflectance of the concave reflecting surface at the stimulated emission wavelength is 99.6%.

The optical amplifier 1 according to the present embodiment with the above-described arrangement operates as follows. The pumping light outputted from the laser diode 11a propagates through the optical fiber 12a and is emitted from the exit end 13a. The emitted pumping light is converged by the lens system 14a, transmitted successively through the mirror 15a and the window 122, and introduced inside the vacuum container 121. The pumping light that is introduced into the vacuum container 121 is transmitted through the transparent member 152 and thereafter illuminated perpendicularly on one of the main surfaces of the solid-state laser medium 151. The pumping light outputted from the laser diode 11b propagates through the optical fiber 12b and is emitted from the exit end 13b. The emitted pumping light is converged by the lens system 14b, is transmitted successively through the mirror 15b and the window 123, and is introduced inside the vacuum container 121. The pumping light introduced into the vacuum container 121 is transmitted through the transparent member 153, and is thereafter illuminated perpendicularly on the other main surface of the solid-state laser medium 151. By the pumping light thus being illuminated on the respective main surfaces of the solid-state laser medium 151, the active element contained in the solid-state laser medium 151 is pumped.

Light $L_0$ to be amplified is made incident at a predetermined angle on the concave surface of the mirror 15a, and is reflected by the concave surface of the mirror 15a. The reflected light $L_0$ is transmitted through the window 122, and is introduced inside the vacuum container 121. Inside the vacuum container 121, the reflected light $L_0$ is transmitted through the transparent member 152, and is made incident perpendicularly on one of the main surfaces of the laser medium 151. The light $L_0$ that is thus made incident is amplified by the stimulated emission phenomenon inside the solid-state laser medium 151. Light $L_1$, which has been amplified in the solid-state laser medium 151, is emitted perpendicularly from the other main surface of the solid-state laser medium 151, and is transmitted through the transparent member 153 and the window 123. The transmitted amplified light $L_1$ is then reflected by the concave surface of the mirror 15b. The light (amplified light $L_1$) reflected by the concave surface of the mirror 15b becomes the output light of the optical amplifier 1.

As described above, with the optical amplifier 1 according to the embodiment, the pumping light is made incident perpendicularly on each of the respective main surfaces of the solid-state laser medium 151 included in the solid-state laser module 10, and the to-be-amplified light $L_0$ is made incident perpendicularly on one of the main surfaces of the solid-state laser medium 151. When it is assumed that the transparent members 152, 153 are not provided, when the to-be-amplified light $L_0$ is amplified by the solid-state laser medium 151 and thereafter emitted as the output light $L_1$, the wavefront of the output light L1 becomes disturbed due to the thermal lens effect caused in the solid-state laser medium 151 by the pumping light illumination. However, in the present embodiment, the transparent members 152, 153 of high thermal conductivity are disposed in a state of being in direct contact with the main surfaces of the solid-state laser medium 151 and the heat insulating member 156 of low thermal conductivity is disposed in a state of being in direct contact with the side surfaces of the solid-state laser medium 151. Thus, as explained using FIGS. 5 and 6, the thermal lens effect, due to illumination of the pumping light onto the solid-state laser medium 151, is reduced. That is, when the to-be-amplified light $L_0$ is amplified by the solid-state laser medium 151 and thereafter emitted as the output light $L_1$, the wavefront disturbance of the output light $L_1$ is suppressed effectively and an optical output of high quality is obtained.

Figure 8:
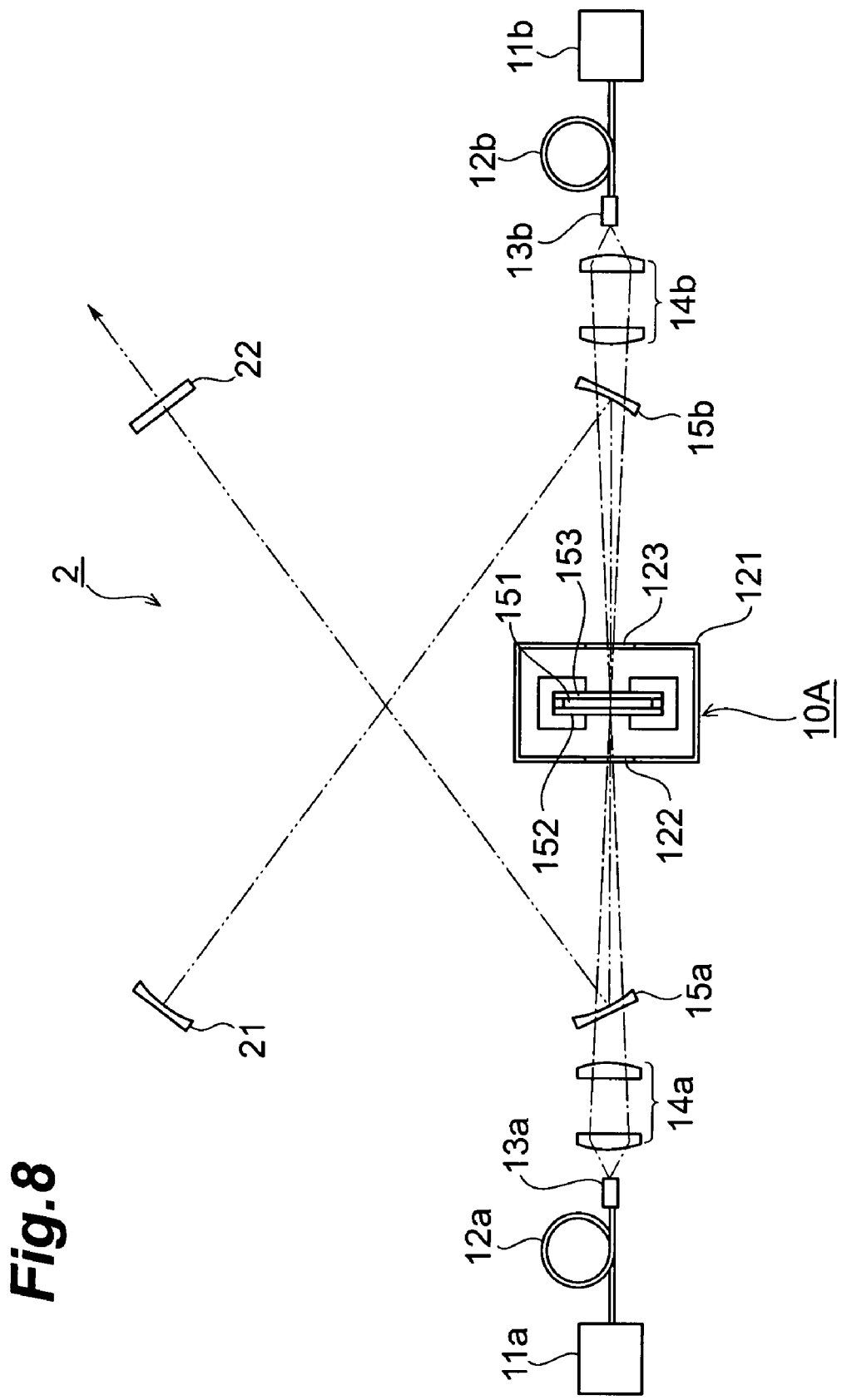
FIG. 8 is a diagram of an arrangement of a first embodiment of a laser oscillator according to the present invention.

A first embodiment of a laser oscillator according to the present invention will now be explained. FIG. 8 is a diagram of an arrangement of the first embodiment of the laser oscillator according to the present invention. The laser oscillator 2 shown in FIG. 8 comprises the solid-state laser module 10 with the above-described structure (the embodiment of the solid-state laser module according to the present invention). However, in FIG. 8, only the major portion 10A of the solid-state laser module 10 is shown. This laser oscillator 2 also comprises the laser diodes 11a, 11b, the optical fibers 12a, 12b, the lens systems 14a, 14b, the mirrors 15a, 15b, a rear mirror 21, and an output mirror 22. As compared with the arrangement of the optical amplifier 1 shown in FIG. 7, the laser oscillator 2 shown in FIG. 8 differs in further having the rear mirror 21 and the output mirror 22.

The rear mirror 21 has a concave reflecting surface and can reflect the stimulated emission light, generated inside the solid-state laser medium 151, by its concave surface. The output mirror 22 is a plane mirror, and when the stimulated emission light generated inside the solid-state laser medium 151 is made incident, transmits a portion of the stimulated emission light, and reflects the rest of the stimulated emission light. The wavelength of the stimulated emission light is 1030 nm, the reflectance of the rear mirror 21 at the stimulated emission wavelength is 99.6%, and the reflectance of the output mirror 22 at the stimulated emission wavelength is 85%. Also, the radius of curvature of the concave reflecting surface of the rear mirror 21 is, for example, 1000 mm.

The rear mirror 21 and the output mirror 22 constitute a portion of a Fabry-Perot resonator. The solid state laser medium 151, the transparent members 152, 153, and the mirrors 15a, 15b are disposed along a resonance optical path of this resonator. The radii of curvature of the respective reflecting surfaces of the mirrors 15a, 15b, the rear mirror 21, and the output mirror 22 are set such that the laser oscillator 2 operates as a stable resonator and such that the beam diameter of the resonance light in the solid-state laser medium 151 is minimized. The resonance optical path of the resonator is perpendicular to the main surfaces of the solid-state laser medium 151. By arranging the mirrors 15a, 15b along the resonance optical path, an x-shaped resonator is configured.

The laser oscillator 2 according to the first embodiment with the above-described arrangement operates as follows. The pumping light outputted from the laser diode 11a propagates through the optical fiber 12a and is emitted from the exit end 13a. The pumping light emitted from the exit end 13a is converged by the lens system 14a, thereafter transmitted successively through the mirror 15a and the window 122, and introduced inside the vacuum container 121. The pumping light introduced into the vacuum container 121 is transmitted through the transparent member 152 and thereafter illuminated perpendicularly on one of the main surfaces of the solid-state laser medium 151. Meanwhile, the pumping light outputted from the laser diode 11b propagates through the optical fiber 12b and is emitted from the exit end 13b. The pumping light emitted from the exit end 13b is converged by the lens system 14b, thereafter transmitted successively through the mirror 15b and the window 123, and introduced inside the vacuum container 121. The pumping light introduced into the vacuum container 121 is transmitted through the transparent member 153 and thereafter illuminated perpendicularly on the other main surface of the solid-state laser medium 151. By the pumping light thus being illuminated perpendicularly on both main surfaces of the solid-state laser medium 151, the active element contained in the solid-state laser medium 151 is pumped.

Spontaneous emission light is generated when the active element, contained in the solid-state laser medium 151, transits from an upper laser level to a lower laser level, and the emission light resonates between the rear mirror 21 and the output mirror 22 to give rise to stimulated emission in the solid-state laser medium 151. A portion of the stimulated emission light is transmitted through the output mirror 22 and becomes the output light of the laser oscillator 2.

The solid-state laser medium 151 is, for example, YAG doped with Yb element of 25 at %. The wavelength of the pumping light is 940 nm, the pumping light power is 580 mW, the beam diameter of the pumping light illuminated onto the solid-state laser medium 151 is 180 μm, and the energy density of pumping light illumination onto the solid-state laser medium 151 is 2.3 kW/cm$^2$. In this case, 98% or more of the pumping light made incident on the solid-state laser medium 151 is absorbed by the solid-state laser medium 151. Because the resonator is an x-shaped resonator, just the mirrors 15a, 15b may be arranged to be the optical elements present between the laser diodes 11a, 11b and the solid-state laser medium 151 to minimize the loss of the pumping light. The power of the laser light of 1030 nm generated in the excited solid-state laser medium 151 (the laser light outputted upon transmission through the output mirror 22) was 430 mW. As the slope efficiency, a high value of 90%, which is extremely close to the theoretical limit (91%), was obtained, and the light-to-light conversion efficiency was 74%.

In the laser oscillator 2, a saturable absorption mirror may be used in place of the rear mirror 21, and by the use of a saturable absorption mirror, mode-synchronized, pulse laser oscillation is enabled. In the same conditions as those described above, stable pulse oscillation with a pulse cycle of 6.8 picoseconds was obtained.

As described above, with the laser oscillator 2 according to the first embodiment, the pumping light is made incident perpendicularly on each of the respective main surfaces of the solid-state laser medium 151 included in the solid-state laser module 10. Also, both of the main surfaces of the solid-state laser medium 151 are perpendicular to the resonance optical path of the resonator. In the present embodiment, the transparent members 152, 153 of high thermal conductivity are disposed in a state of being in direct contact with the main surfaces of the solid-state laser medium 151. Furthermore, in the present embodiment, the heat insulating member 156 of low thermal conductivity is disposed in a state of being in direct contact with the side surfaces of the solid-state laser medium 151. By these structural characteristics, the thermal lens effect, due to illumination of the pumping light onto the solid-state laser medium 151, is reduced as explained using FIGS. 5 and 6. The wavefront disturbance of the light emitted from the solid-state laser medium 151 is thus suppressed and a laser light output of high quality is obtained.

Figure 9:
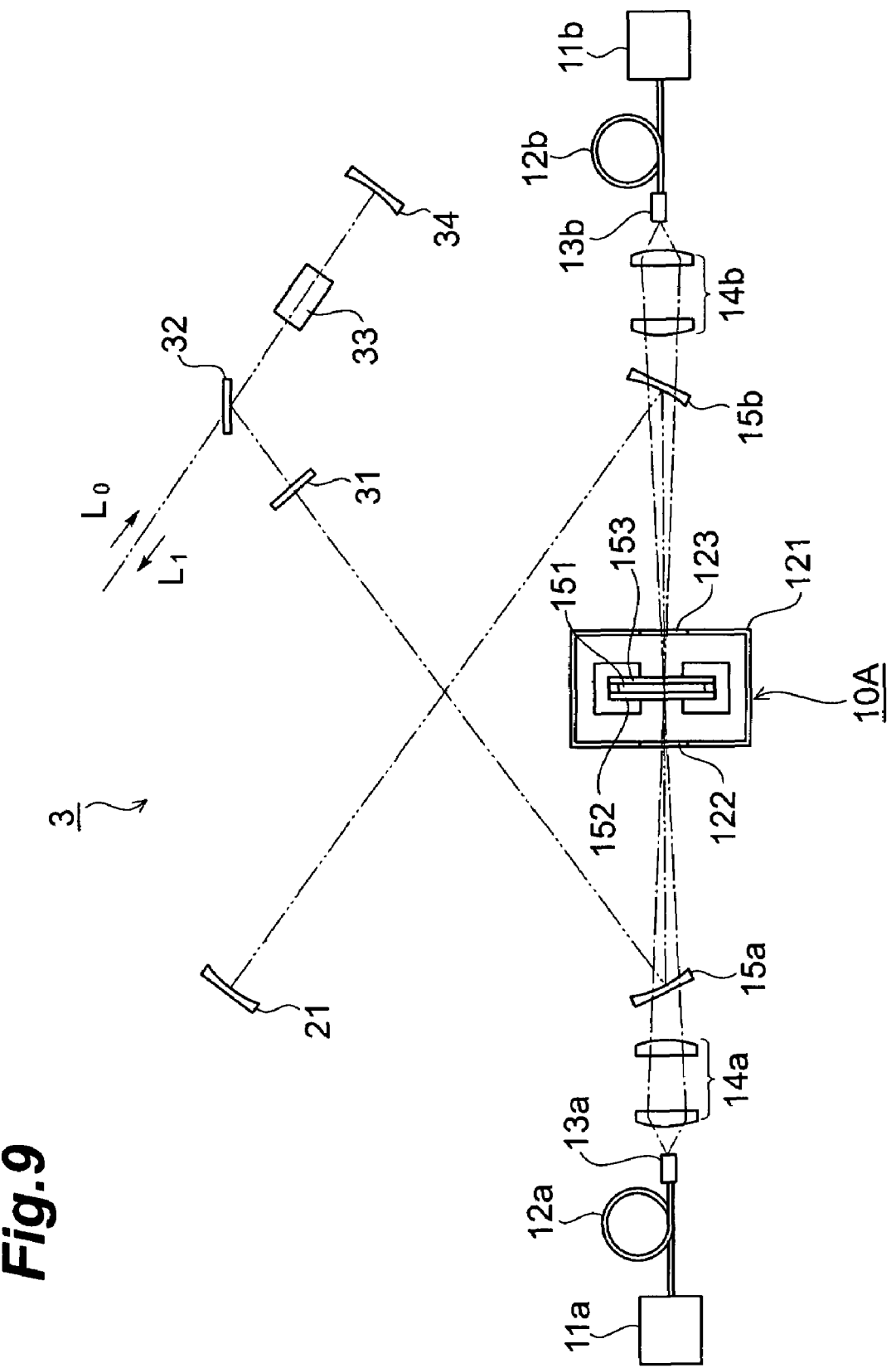
FIG. 9 is a diagram of an arrangement of a second embodiment of a laser oscillator according to the present invention.

A second embodiment of a laser oscillator according to the present invention will now be explained. FIG. 9 is a diagram of an arrangement of the second embodiment of the laser oscillator according to the present invention. The laser oscillator 3 shown in FIG. 9 comprises the solid-state laser module 10 with the above-described structure (the embodiment of the solid-state laser module according to the present invention). However, in FIG. 9, only the major portion 10A of the solid-state laser module 10 is shown. This laser oscillator 3 also comprises the laser diodes 11a, 11b, the optical fibers 12a, 12b, the lens systems 14a, 14b, the mirrors 15a, 15b, the rear mirror 21, a ½ wave plate 31, a polarizing plate 32, a Pockel's cell 33, and a mirror 34. As compared with the arrangement of the laser oscillator 2 according to the first embodiment shown in FIG. 8, the laser oscillator 3 of the second embodiment shown in FIG. 9 differs in further having, in place of the output mirror 22, the ½ wave plate 31, the polarizing plate 32, the Pockel's cell 33, and the mirror 34.

The ½ wave plate 31 is disposed along an optical path between the mirror 15a and the polarizing plate 32 and, when linearly polarized light is made incident thereon, rotates the polarization direction of the incident light by 90 degrees. The polarizing plate 32 transmits P-polarized light and reflects S-polarized light, arriving from the ½ wave plate 31, to the Pockel's cell 33. The polarizing plate 32 also reflects the S-polarized light, arriving from the Pockel's cell 33, to the ½ wave plate 31. The Pockel's cell 33 is disposed along an optical path between the polarizing plate 32 and the mirror 34 and, when linearly polarized light is made incident thereon, rotates the polarization direction of the light. The Pockel's cell 33 is comprised of a KDP crystal, and the polarization direction rotation angle can be changed by adjusting the value of a voltage applied to the KDP crystal. The mirror 34 is an optical element that reflects the light, arriving from the Pockel's cell 33, to the Pockel's cell 33 and the reflecting surface thereof is a concave surface. The radius of curvature of the concave reflecting surface of the mirror 34 is, for example, 2000 mm and the reflectance at the emission wavelength is 99.6%.

Each of the rear mirror 21 and the mirror 34 constitutes a portion of a Fabry-Perot resonator. The solid state laser medium 151, the transparent members 152, 153, the mirrors 15a, 15b, the ½ wave plate 31, the polarizing plate 32, and the Pockel's cell 33 are disposed along a resonance optical path of this resonator. The radii of curvature of the respective reflecting surfaces of the mirrors 15a, 15b, the rear mirror 21, and the mirror 34 are set such that the laser oscillator 3 operates as a stable resonator and such that the beam diameter of the resonance light in the solid-state laser medium 151 is minimized. The resonance optical path of the resonator is perpendicular to the main surfaces of the solid-state laser medium 151. By arranging the mirrors 15a, 15b along the resonance optical path, an x-shaped resonator is configured.

The laser oscillator 3 according to the second embodiment with the above-described arrangement operates as follows. The pumping light outputted from the laser diode 11a propagates through the optical fiber 12a and is emitted from the exit end 13a. The pumping light emitted from the exit end 13a is converged by the lens system 14a, thereafter transmitted successively through the mirror 15a and the window 122, and introduced inside the vacuum container 121. The pumping light introduced into the vacuum container 121 is transmitted through the transparent member 152 and thereafter illuminated perpendicularly on one of the main surfaces of the solid-state laser medium 151. Meanwhile, the pumping light outputted from the laser diode 11b propagates through the optical fiber 12b and is emitted from the exit end 13b. The pumping light emitted from the exit end 13b is converged by the lens system 14b, thereafter transmitted successively through the mirror 15b and the window 123, and introduced inside the vacuum container 121. The pumping light introduced into the vacuum container 121 is transmitted through the transparent member 153 and thereafter illuminated perpendicularly on the other main surface of the solid-state laser medium 151. By the pumping light thus being illuminated perpendicularly on both main surfaces of the solid-state laser medium 151, the active element contained in the solid-state laser medium 151 is excited.

When a P-polarized pulse laser seed light $L_0$ from the exterior is made incident on the polarizing plate 32, the laser seed light $L_0$ is transmitted through the polarizing plate 32 and thereafter arrives at the Pockel's cell 33. Because the Pockel's cell 33 is made to act as a ¼ wave plate by application of a predetermined voltage, the laser seed light $L_0$ that has arrived is rotated in polarization direction by 45 degrees by the Pockel's cell 33 and thereafter reflected by the mirror 34. The laser seed light $L_0$ reflected by the mirror 34 is rotated in polarization direction by 45 degrees by the Pockel's cell 33 again and thereafter made incident on the polarizing plate 32. Because the laser seed light $L_0$ that arrives at the polarizing plate 32 at this point is S-polarized light, it is reflected by the polarizing plate 32 and then rotated in polarization direction by 90 degrees by the ½ wave plate 31. The laser seed light $L_0$ that is then reflected by the mirror 15a is transmitted through the transparent member 152 and thereafter made incident perpendicularly on a main surface of the solid-state laser medium 151. In the solid-state laser medium 151, the incident laser seed light $L_0$ is optically amplified by the stimulated emission phenomenon.

The light amplified in the solid-state laser medium 151 is emitted perpendicularly from the other main surface of the solid-state laser medium 151. The emitted light (amplified light) that is transmitted through the transparent member 153 is reflected by the mirror 15b and is thereafter reflected by the rear mirror 21. The light thus reflected by the rear mirror 21 is transmitted through the mirror 15b, the solid-state laser medium 151, and the mirror 15a, and then is rotated in polarization direction by 90 degrees by the ½ wave plate 31. The reflected light is thus reflected by the polarizing plate 32 and arrives at the Pockel's cell 33.

However, at this point, the value of the voltage applied to the Pockel's cell 33 is changed, and after the point in time of change of voltage value, the Pockel's cell 33 acts as a ½ wave plate. The polarization direction of the light passing through the Pockel's cell 33 in this state is rotated by 90 degrees. The laser seed light $L_0$ thus reciprocates between the rear mirror 21 and the mirror 34 and is amplified by the solid-state laser medium 151 in this process. Then after the elapse of a fixed time, the value of the voltage applied to the Pockel's cell 33 is changed again, and then after the point in time of this change, the Pockel's cell 33 acts as a ¼ wave plate. The polarization direction of the light passing through the Pockel's cell 33 in this state is rotated by 45 degrees. The light, which is amplified in the resonator until then, is thus transmitted through the polarizing light 32 and is outputted as the laser output light $L_1$.

For example, the solid-state laser medium 151 is YAG doped with Yb element of 25 at %, the wavelength of the pumping light is 940 nm, the pumping light power is 140 mW, the beam diameter of the pumping light illuminated onto the solid-state laser medium 151 is 2 mm, and the energy density of pumping light illumination onto the solid-state laser medium 151 is 2.3 kW/cm$^2$. The P-polarized pulse laser seed light $L_0$ that is made incident on the polarizing plate 32 from the exterior has a wavelength of 1030 nm, a pulse width of 6.8 picoseconds, and a pulse frequency of 50 Hz. At the wavelength of 1030 nm, the polarizing plate 32 has a P-polarized light transmittance of 98.7% and an S-polarized light reflectance of 99.7%. The reflectance of the mirror 34 at the wavelength of 1030 nm is 99.7%. The optical path length along the resonance optical path between the rear mirror 21 and the mirror 34 is 2100 nm. When the period during which the Pockel's cell 33 acts as a ½ wave plate in this process is 140 nanoseconds, the laser seed light $L_0$ can be amplified by reciprocating 10 times inside the resonator during this period. Then when the Pockel's cell 33 is made to act as a ¼ wave plate, the light amplified in the resonator until then is transmitted through the polarizing plate 32 and outputted as the laser output light $L_1$.

As described above, the pumping light is made incident perpendicularly on each of the respective main surfaces of the solid-state laser medium 151 included in the solid-state laser module 10 with the laser oscillator 3 according to the second embodiment as well. Also, both of the main surfaces of the solid-state laser medium 151 are perpendicular to the resonance optical path of the resonator. In the present embodiment, the transparent members 152, 153 of high thermal conductivity are disposed in a state of being in direct contact with the main surfaces of the solid-state laser medium 151, and furthermore, the heat insulating member 156 of low thermal conductivity is disposed in a state of being in direct contact with the side surfaces of the solid-state laser medium 151. Thus, as explained using FIGS. 5 and 6, the thermal lens effect, due to illumination of the pumping light onto the solid-state laser medium 151, is reduced. The wavefront disturbance of the stimulated emission light emitted from the solid-state laser medium 151 is thus suppressed and a laser light output of high quality is obtained.

The present invention is not restricted to the above-described embodiments and various modifications are possible. The solid-state laser medium 151 is not restricted to Yb:YAG. For example, the active element doped into the solid-state laser medium may be a rare earth element or a transition metal element, such as Nd, Tm, Ho, Cr, and so on. The host material of the solid-state laser medium 151 may be ruby, YLF, sapphire, glass, S-FAP, YVO$_4$, and so on. The transparent members 152, 153 are not restricted to sapphire glass. The transparent members 152, 153 may be comprised of another material that is higher in thermal conductivity than the solid-state laser medium 151, and may, for example, be diamond, yttrium oxide, YAG without an impurity doped, and so on Because diamond has a high thermal conductivity of 1000 W/m·K at room temperature, the cooling mechanism can be made compact and simple, or it may become possible to cool the solid-state laser medium adequately without performing cooling by liquid nitrogen. The heat insulating member 156 is not restricted to Teflon or other resin. The heat insulating member 156 that constitutes the heat insulating region may be another material that is lower in heat conductivity than the solid-state laser medium 151 and, for example, may be foam glass, air or other gas, or vacuum.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The solid-state laser module according to the present invention can be applied to an optical amplifier, laser oscillator, and so on that can provide an optical output of high quality.

The invention claimed is:

1. A solid-state laser module comprising:
   a solid-state laser medium, doped with an active element that is pumped by the pumping light with a first wavelength, generating emission light with a second wavelength into its interior in response to illumination of the pumping light;
   a first member provided such that a contact surface of said first member is in a state of being in direct contact with a first main surface of said solid-state laser medium, said first member being comprised of a material transparent to both the pumping light and the emission light, and having a higher thermal conductivity than said solid-state laser medium;
   a second member provided such that a contact surface of said second member is in a state of being in direct contact with a second main surface said solid-state laser medium that opposes the first main surface, said second member being comprised of a material transparent to both the pumping light and the emission light, and having a higher thermal conductivity than said solid-state laser medium;
   a heat sink provided so as to clamp at least a portion of each of said first and second members that sandwich said solid-state laser medium therebetween, in a state of being separated by a predetermined distance from said solid-state laser medium; and
   a solid-state heat insulating member, provided between said heat sink and side surfaces of said solid-state laser medium that communicates between said first and the second main surfaces, having a lower thermal conductivity than said solid-state laser medium, said solid-state heat insulating member having a first main surface being in direct contact with said contact surface of said first member and a second main surface being in direct contact with said contact surface of said second member,
   wherein the contact surface dimension of said first member is approximately equal to the overall first main surface dimensions of said solid-state laser medium and said solid-state heat insulating member, and the contact surface dimension of said second member is approximately equal to the overall second main surface dimensions of said solid-state laser medium and said solid-state heat insulating member.

2. A solid-state laser module according to claim 1, wherein a surface of said first member, at least a portion of which is in contact with the first main surface of said solid-state laser medium, has a wider area than the first main surface, and a surface of said second member, at least a portion of which is in contact with the second main surface of said solid-state laser medium, has a wider area than the second main surface.

3. A solid-state laser module according to claim 2, wherein said first and second members function as spacers for defining the intervals between the side surfaces of said solid-state laser medium and said heat sink.

4. A solid-state laser module according to claim 1, further comprising a cooling device for cooling said heat sink.

5. A solid-state laser module according to claim 4, further comprising a heating device for heating said heat sink.

6. A solid-state laser module according to claim 4, further comprising a sealed container whose interior is pressure-reduced to a predetermined degree of vacuum, said sealed container having a space that houses at least said solid-state laser medium, said first member, and said second member, and then having a window for transmitting the pumping light and the emission light therethrough.

7. An optical amplifier comprising:
   a solid-state laser module according to claim 1; and
   a pumping light source for illuminating pumping light onto said solid-state laser medium included in said solid-state laser module.

8. A laser oscillator comprising:
   a solid-state laser module according to claim 1;
   a pumping light source for illuminating pumping light onto said solid-state laser medium included in said solid-state laser module; and
   a resonator in which said solid-state laser medium included in said solid-state laser module is disposed along a resonance optical path.

* * * * *